United States Patent
Kawamura

[11] Patent Number: 6,119,457
[45] Date of Patent: Sep. 19, 2000

[54] HEAT EXCHANGER APPARATUS USING POROUS MATERIAL, AND CERAMIC ENGINE PROVIDED WITH SUPERCHARGER DRIVEN BY THERMAL ENERGY RECORDED FROM EXHAUST GAS BY THE SAME APPARATUS

[75] Inventor: Hideo Kawamura, Kanagawa-ken, Japan

[73] Assignee: Isuzu Ceramics Research Institute Co., Ltd., Kanagawa-ken, Japan

[21] Appl. No.: 09/058,556

[22] Filed: Apr. 13, 1998

[30] Foreign Application Priority Data

Apr. 23, 1997 [JP] Japan ................................. 9-118657
Apr. 23, 1997 [JP] Japan ................................. 9-118658

[51] Int. Cl.$^7$ .................................................. F01K 23/10
[52] U.S. Cl. .............................. 60/618; 60/514; 165/51; 165/907
[58] Field of Search ................................. 60/618, 641.5, 60/514; 123/65 BA, 119; 122/406.5; 264/635

[56] References Cited

U.S. PATENT DOCUMENTS

| | | | |
|---|---|---|---|
| 3,948,235 | 4/1976 | Gamell | 123/119 C |
| 4,334,409 | 6/1982 | Daugas | 60/618 |
| 4,394,813 | 7/1983 | Tanaka et al. | |
| 4,426,847 | 1/1984 | Fischer | 60/514 |
| 5,194,154 | 3/1993 | Moyer et al. | |
| 5,708,306 | 1/1998 | Lin | 307/10.1 |
| 5,713,311 | 2/1998 | Fitzgerald | 122/406.5 |
| 5,839,282 | 11/1998 | Bronicki et al. | 60/641.5 |
| 5,853,654 | 12/1998 | Meynckens et al. | 264/635 |
| 5,876,633 | 3/1999 | Lawson, Jr. | 60/618 |
| 5,878,703 | 2/1999 | Sweeney | 123/65 BA |

FOREIGN PATENT DOCUMENTS

| | | |
|---|---|---|
| 0141634 | 5/1985 | European Pat. Off. . |
| 0843082 | 5/1998 | European Pat. Off. . |
| 2745995 | 4/1979 | Germany . |
| 5-179972 | 7/1993 | Japan . |
| 6-033707 | 2/1994 | Japan . |
| 06033707 | 8/1994 | Japan . |
| 1163577 | 9/1969 | United Kingdom . |
| 9616000 | 5/1996 | WIPO . |

*Primary Examiner*—Thomas Denion
*Assistant Examiner*—Tu M. Nguyen
*Attorney, Agent, or Firm*—Browdy and Neimark

[57] ABSTRACT

A heat exchange apparatus has heat exchangers comprising porous material of improved heat exchange efficiency provided in an exhaust passage, and a ceramic engine provided with a supercharger comparing a steam turbine driven by the steam generated in the heat exchanger apparatus. The heat exchange apparatus comprises a high temperature heat exchanger having a steam passage provided in an exhaust gas passage through which an exhaust gas passes whereby steam is heated, and a low temperature heat exchanger provided in the portion of the exhaust gas passage on the downstream side of the high temperature heat exchanger which has a water passage for heating water by the exhaust gas. The ceramic engine has a steam turbine type supercharger provided with a steam turbine driven by the steam from the high temperature heat exchanges, a compressor, and a condenser which separates a fluid discharged from the steam turbine into water and low temperature steam. Pressurized air from the compressor is supplied to the combustion chamber, which presses down a piston to carry out compression work during an intake stroke.

12 Claims, 4 Drawing Sheets

HEAT EXCHANGER APPARATUS USING POROUS MATERIAL, AND CERAMIC ENGINE PROVIDED WITH SUPERCHARGER DRIVEN BY THERMAL ENERGY RECORDED FROM EXHAUST GAS BY THE SAME APPARATUS

BACKGROUND OF THE INVENTION

1. Field of the Invention

This invention relates to a heat exchanger apparatus comprising heat exchangers in which a porous material through which a fluid, such as an exhaust gas and vapor can pass is packed in passages, and a ceramic engine provided with a supercharger driven by the thermal energy recovered from an exhaust gas by the same heat exchanger apparatus.

2. Description of the Prior Art

A conventional turbocharger-carrying heat insulating engine is provided in a first stage of an exhaust system with a turbine-and-compressor-carrying turbocharger, and on the downstream side of the turbocharger with an energy recovery unit comprising a generator-carrying turbine. In the heat insulating engine, a combustion chamber is formed with a heat insulating structure, and the thermal energy of an exhaust gas discharged from the combustion chamber is recovered as electric power by the turbocharger and energy recovery unit, this thermal energy being otherwise recovered by being supercharged to the engine by the operations of the turbocharger and compressor.

An example of an energy recovery system formed so as not to lower the recovery efficiency of the exhaust gas energy with respect to such a heat insulating engine is disclosed in Japanese Patent Laid-Open No. 179972/1993. This energy recovery system has an energy recovery unit provided with a first turbine installed in an exhaust passage and a generator operated by the first turbine, a turbocharger provided with a second turbine connected to an outlet-side passage of the first turbine and a supercharging compressor operated by the second turbine, and a waste gate provided in the outlet-side passage of the first turbine. Since an energy recovering operation is carried out by the energy recovery unit when the temperature of the exhaust gas is high, the recovering of the energy is done effectively.

In a cogeneration system, the power is taken out as electric energy by a generator, and water is heated with electric power based on the thermal energy of an exhaust gas and a heat exchanger provided in an exhaust passage to produce hot water, which is utilized as a hot water supply source. Such a cogeneration system is subjected to a rated operation in which the load fluctuation is small, so that it is expected to be utilized as a power supply system in an urban area and a mountainous area.

Such a cogeneration system is disclosed in, for example, Japanese Patent Laid-Open No. 33707/1994. The cogeneration engine is adapted to generate steam by the exhaust gas energy, and improve the thermal efficiency by recovering the steam energy as electric energy. A turbocharger is driven by the exhaust gas energy from a heat insulating gas engine, and a generator-carrying energy recovery unit is driven by the exhaust gas energy from the turbocharger. The thermal energy of an exhaust gas from the energy recovery unit is converted into steam by a first heat exchanger, and recovered as electric energy by driving a steam turbine by the mentioned steam. Furthermore, hot water is generated by the high-temperature steam from the steam turbine by an operation of a second heat exchanger, and utilized as a hot water supply source.

A heat exchanger has to change its structure depending upon gas-phase and liquid-phase heat exchanging substances. When the structure is complicated, or, when consideration is not given to the structure with respect to the strength thereof, a crack or breakage occurs in the heat exchanger. In order to improve the thermal efficiency in a heat exchanger by increasing the temperature of the suction gas in, for example, a gas turbine, exchanging of heat between a gas and a gas has to be effected. In general, a heat exchanger is formed with a structure having a rotating cylindrical honeycomb unit, and capable of heating an intake gas with an exhaust gas, whereby the intake gas can receive heat. This type of heat exchanger is effective to exchange heat between an exhaust gas and an intake gas. However, the construction becomes complicated, and cracks occur in a wall intake surface to cause an exhaust gas to be mixed in the intake gas.

In the above-described heat insulating engine, a combustion chamber is formed with a heat insulating structure, and a turbocharger and an energy recovery turbine are disposed in series. A high exhaust back pressure occurs in an exhaust stroke of a piston, i.e., a pressure against the discharging of an exhaust gas occurs, so that applying a discharge pressure to the exhaust gas is required in which negative work is carried out under compulsion. For example, in a heat insulating engine, pressure ratios in the turbocharger and energy recovery turbine are 2 respectively, and, assuming that the pressure at an outlet portion of the energy recovery turbine is atmospheric pressure, the back pressure at an outlet of the combustion chamber of the engine reaches $2\times2=4$ $(kg/cm^2)$, which constitutes negative work in an exhaust stroke of the piston and becomes a loss.

Since an exhaust gas discharged from a combustion chamber has not only a pressure but also thermal energy, it is necessary to recover the thermal energy from the exhaust gas effectively.

When a turbine-side efficiency and a compressor-side efficiency in a turbocharger are, for example, around 80% respectively, a recovery efficiency attained by the turbine and compressor is $0.8\times0.8=0.64(=64\%)$. When an energy recovery-side turbine efficiency and a conversion efficiency are 0.8 and 0.85 respectively, a total recovery efficiency becomes 0.68.

When the efficiency of the turbocharger is taken into consideration, the thermal energy therein is high since the temperature of the exhaust gas is high. When the work conversion rate of exhaust thermal energy is set twofold, the energy recovered at the suction side is $2\times2\times0.64=2.56$ $(kg/cm^2)$. However, since 2 $kg/cm^2$ is consumed as negative work due to a back pressure, the gain of the energy recovered by the turbocharger is $2.56-2=0.56$ $(kg/cm^2)$.

When the efficiency of the energy recovery turbine which includes a rate of converting the thermal energy into power is twofold, the recovered energy is $2\times2\times0.68=2.72$ $(kg/cm^2)$. However, since 2 $kg/cm^2$ is consumed as negative work due to a back pressure, the gain of the energy recovered by the energy recovery turbine is $2.72-2=0.72$ $(kg/cm^2)$.

Accordingly, the gain of the total energy recovered by the turbocharger and energy recovery turbine is $0.56+0.72=1.28$ $(kg/cm^2)$. Therefore, even when consideration is given to the suction boosting of the turbocharger and energy recovery efficiency, a loss due to a back pressure reaches a high level.

Referring to a PV diagram of FIG. 6, the following may be understood. In a conventional engine provided with a turbocharger and an energy recovery turbine, an exhaust valve is opened at the beginning ES of an exhaust stroke, and an exhaust gas blows down BD and is discharged to an exhaust passage until a terminal end ET of the exhaust stroke as shown in a hatched portions EIS of the PV diagram of FIG. 6. The pressure and thermal energy (5.2 kg/cm²) of the exhaust gas are recovered as turbine work by the turbocharger and energy recovery turbine. However, the exhaust gas is forced out from the beginning ES of an exhaust stroke to a terminal end ET thereof, and the air is sucked into a combustion chamber from the beginning IS of an intake stroke to a terminal end IT thereof, so that the hatched portion EIS of the PV diagram constitutes negative work.

SUMMARY OF THE INVENTION

An object of the present invention is to provide a heat exchanger apparatus comprising heat exchangers formed out of a porous material capable of increasing a heat exchanger effectiveness, in which porous members formed of silicon nitride by utilizing the properties thereof including its high resistance to a thermal shock, high bending strength and high corrosion resistance are provided in an isolated manner in gas flow passages; and a ceramic engine provided with a thermal energy-driven supercharger, capable of generating high-temperature steam by the thermal energy of an exhaust gas by using heat exchangers provided in exhaust pipes from which an exhaust gas from a combustion chamber is discharged, generating pressurized air by driving a compressor in a steam turbine type supercharger by the steam pressure, making a piston carry out compression work by supplying the pressurized air to the combustion chamber in an intake stroke, and improving the thermal efficiency by effectively recovering the thermal energy of the exhaust gas.

The present invention relates to a heat exchanger apparatus having heat exchangers provided in an exhaust pipe in which a high-temperature exhaust gas flows and adapted to heat a fluid by the thermal energy of the exhaust gas flowing in the exhaust pipe, comprising exhaust gas passages through which the exhaust gas from the exhaust pipe passes, fluid passages isolated from the exhaust gas passages by partition walls and permitting a fluid heated with the exhaust gas to flow therein, and porous members packed in the exhaust gas passages and fluid passages and having open pores.

Concretely speaking, this heat exchanger apparatus comprises a first heat exchanger provided in the exhaust pipe and adapted to heat steam to a high temperature by the thermal energy of an exhaust gas flowing in the exhaust pipe, and a second heat exchanger provided in the portion of the exhaust pipe which is on the downstream side of the first heat exchanger and adapted to heat water into steam by the thermal energy of the exhaust gas, the first heat exchanger being provided with a steam passage, in which steam passes, isolated from and extending in parallel with a first exhaust gas passage in which an exhaust gas passes, and packed with open pore-carrying porous members, the second heat exchanger being provided with a water passage, in which water passes, isolated from and extending in parallel with a second exhaust gas passage in which an exhaust gas passes, the first and second exhaust gas passages and steam passage being packed with open pore-carrying porous members, the water passage and steam passage being connected together by a passage.

Let $A_{gi}$ equal an exhaust gas contacting area, $A_1$ a wall surface area at which the steam passage is exposed to the first exhaust gas passage, and $A_{g2}$ a steam contacting area, and the first heat exchanger has the relation satisfying the following expression.

$$A_{gi}:A_1:A_{g2}=(1/\alpha_{g1}):(\delta/\lambda):(1/\alpha_{g2})$$

wherein $\delta$ represents a wall thickness, $\lambda$ heat conductivity, $\alpha_{g1}$ a heat transfer coefficient of an exhaust gas, and $\alpha_{g2}$ a heat transfer coefficient of steam.

Let $A_{gi}$ equal an exhaust gas contacting area, $A_2$ a wall surface area at which the water passage is exposed to the second exhaust gas passage, and $A_c$ a water contacting area, and the second heat exchanger has the relation satisfying the following expression.

$$A_{g1}:A_2:A_c=(1/\alpha_{g1}):(\delta/\lambda):(1/\alpha_c)$$

wherein $\delta$ represents a wall thickness, $\lambda$ solid thermal conductivity, $\alpha_{g1}$ a heat transfer coefficient of an exhaust gas, and $\alpha_c$ a heat transfer coefficient of water.

The porous members packed in the steam passage comprises $Si_3N_4$, and the surfaces thereof are coated with SiC. Although SiC has a high heat transfer coefficient, it is not resistant to thermal shock. Therefore, the porous member bodies are formed by using silicon nitride, which has a high strength, and they are coated with SiC. Thus, the heat transfer coefficient of the porous member bodies as well as the corrosion resistance thereof are improved.

In the heat exchangers comprising such a porous material, the gas contacting area of the gas passages can be increased to a great extent, and the heat exchanger efficiency can also be improved greatly. Since the steam obtained by heating and gasifying the water by an exhaust gas in the second heat exchanger is further heated with a high-temperature exhaust gas in the first heat exchanger to turn the steam into high-temperature steam. This enables the thermal energy of the exhaust gas to be converted satisfactorily into steam energy, and the heat exchanger efficiency to be improved.

Since this heat exchanger apparatus has the above-described construction, it is suitably used to convert the thermal energy of a high-temperature exhaust gas discharged from an engine into steam, and can provide a system for driving a steam turbine by steam energy. In a process in which heat is transferred from one substance to another, the quantity of heat transferred is determined by an overall heat transfer coefficient K. When a value of K is large, the quantity of heat transferred becomes large, and, when a value of K becomes smaller, the quantity of heat transferred becomes smaller. When the heat is once transferred from a gas to a solid, it is transferred excellently to another solid through the mentioned solid.

In general, in a process in which the heat is transferred from one substance to another, the quantity Q of heat transferred is represented by the following expression.

$$Q=K \cdot A_s(T_G-T_s) \cdot t$$

wherein K represents an overall heat transfer coefficient, $A_s$ a heat transfer area, $T_G$ the temperature of a high-temperature gas, $T_s$ the temperature of a low-temperature medium, and t a heat transfer period.

The overall heat transfer coefficient K is represented by the following expression.

$$K=1/(X_1+X_2+X_3)$$

wherein $X_1=(1/\alpha_g) \times (A_s/A_g)$; $X_2=(\delta_1/\lambda_1) \times (A_s/A_w)$; $X_3=(1/\alpha_c) \times (A_s/A_c) \alpha_g$; $\alpha_g$ a heat transfer rate of a high-temperature gas, $\lambda_1$ a solid heat transfer conductivity; a heat transfer coefficient of a low-temperature portion; $A_g, A_w, A_c$ contact areas of heat transfer members; and $\delta_1$ the thickness of a wall.

Usually, calculations are made by substituting a heat transfer coefficient of a high-temperature gas and a solid heat transfer coefficient for the above expression.

$\alpha_g$=130 kcal/m²h°C., and, when a silicon nitride member is used as a solid, $\lambda_1$=3.6 kcal/m·h·°C. Judging from these values, when the controlling of $X_1$, $X_2$ and $X_3$ is discussed in accordance with the smallest value of $K=1/(X_1+X_2+X_3)$, the reducing of the value of the area by changing it greatly is the most effective in the members $X_1$ and $X_2$. For example, when the area of $A_g$ in $X_1$ is increased around 15 times, the value of $X_1$ can be reduced to a level substantially equal to that of the value of $X_2$.

In order to increase the area $A_g$ which a high-temperature gas contacts, forming a porous body having open pores or a honeycomb body is conceivable. However, a honeycomb body has to be formed so as to have a considerably high density. Accordingly, in order to increase the area $A_g$, it is most preferable to form the high-temperature gas passage of porous members having open pores through which a gas passes.

The present invention also relates to a ceramic engine comprising a first heat exchanger provided in an exhaust pipe and adapted to heat steam to a high temperature by the thermal energy of an exhaust gas discharged from a combustion chamber of a heat insulating structure through the exhaust pipe, a second heat exchanger provided in the portion of the exhaust pipe which is on the downstream side of the first heat exchanger and adapted to heat the water by the thermal energy of the exhaust gas and turn the water into steam, and a steam turbine type supercharger provided with a steam turbine driven by high-temperature steam from the first heat exchanger, and a compressor driven via a driving shaft of the steam turbine, and adapted to supply pressurized air from the compressor to the combustion chamber.

The pressurized air supplied from the compressor in the steam turbine type supercharger to the combustion chamber presses down a piston, which is moved reciprocatingly in the combustion chamber, during a intake stroke, whereby an engine crank-shaft performs work.

The ceramic engine further has a condenser adapted to separate a fluid discharged from the steam turbine in the steam turbine type supercharger into water and steam and lower the steam pressure, the steam from the second heat exchanger being heated in the first heat exchanger and turned into high-temperature steam, the water from the condenser being gasified into steam in the second heat exchanger.

Since this ceramic engine is constructed as described above, the thermal energy of the exhaust gas discharged from the combustion chamber through the exhaust pipe is converted into steam energy through a pair of heat exchangers, and the steam energy is then converted into pressurized air energy by the steam turbine type supercharger combustion, a steam turbine, and a compressor. The pressurized air supplied from the compressor to the combustion chamber presses down the piston, which is moved reciprocatingly in the combustion chamber, during an intake stroke to have the engine crankshaft perform compression work. Thus, the thermal energy of the exhaust gas is recovered effectively, and the thermal efficiency is improved.

In this ceramic engine, volume expansion occurs when the water turns into steam in the second heat exchanger, and the water works as steam, i.e. a gas. This steam is further heated in the first heat exchanger and turned into high-temperature steam, by which the steam turbine and then compressor is driven to generate pressurized air. The pressurized air is exerted on the piston to perform compression work, whereby the thermal energy of the exhaust gas is recovered. The high-temperature steam drives the steam turbine, so that the energy of the high-temperature steam is consumed. Consequently, the steam is cooled and turned into water to cause the volume thereof to decrease. Owing to a Rankine cycle in which these steps are repeated, the thermal energy of the exhaust gas is recovered by the engine.

Therefore, the pressurized air introduced from the compressor into the combustion chamber presses down the piston to make the engine crankshaft perform work, so that the thermal energy of the exhaust gas is recovered in the form of compression work and supercharging operation by the engine.

This ceramic engine has a condenser adapted to separate the fluid, which is discharged from the steam turbine, into water and steam and lower the steam pressure, and the steam from the second heat exchanger is heated to a high temperature in the first heat exchanger, the water supplied from the condenser being gasified into steam in the second heat exchanger. The first heat exchanger functions as a gas phase to gas phase heat exchanger, in which the steam from the second heat exchanger is heated to a high temperature efficiently. The second heat exchanger functions as a liquid phase to gas phase heat exchanger, in which the water from the condenser is gasified into steam efficiently.

In this ceramic engine, a first check valve is provided in a first steam passage for sending low-temperature steam from the condenser to the first heat exchanger. A second check valve is provided in a second steam passage for sending the steam from the second heat exchanger to the first heat exchanger. Accordingly, the high-temperature steam in the first heat exchanger does not flow back to the condenser and second heat exchanger, so that the high-temperature steam enables the steam turbine to be rotated smoothly.

The combustion chamber, exhaust pipe extending from the combustion chamber to the first heat exchanger, and exhaust pipe extending from the first heat exchanger to the second heat exchanger are formed out of a ceramic material to have a heat insulating structure. Accordingly, the exhaust gas discharged from the combustion chamber through the exhaust pipe can be maintained at a high temperature, and the thermal energy of the exhaust gas is recovered as high-temperature steam effectively by the first and second heat exchangers.

The driving shaft for operatively connecting the compressor to the steam turbine is provided thereon with a generator-motor comprising a rotor formed of a permanent magnet fixedly mounted on the driving shaft, and a stator coil provided on the outer side of the rotor. Therefore, the thermal energy of the exhaust gas is recovered as electric energy by the generator-motor in accordance with the operational condition of the engine.

In this ceramic engine, the thermal energy of an exhaust gas is absorbed in the form of steam in a pair of heat exchangers, and recovered by an operation of the steam turbine, so that this ceramic engine is preferably used as an engine in which an engine load does not vary greatly. Since load variation of an engine for a stationary cogeneration system, which carries out a rated operation for generating electric power in, for example, an urban area and a mountainous area, is small, this ceramic engine is preferably used as an engine for such a cogeneration system.

DESCRIPTION OF THE PREFERRED EMBODIMENTS

The embodiments of the heat exchanger apparatus comprising a porous material, and the ceramic engine provided with a supercharger driven by the thermal energy recovered by the same heat exchanger apparatus according to the present invention will now be described with reference to the drawings.

Figure 1:
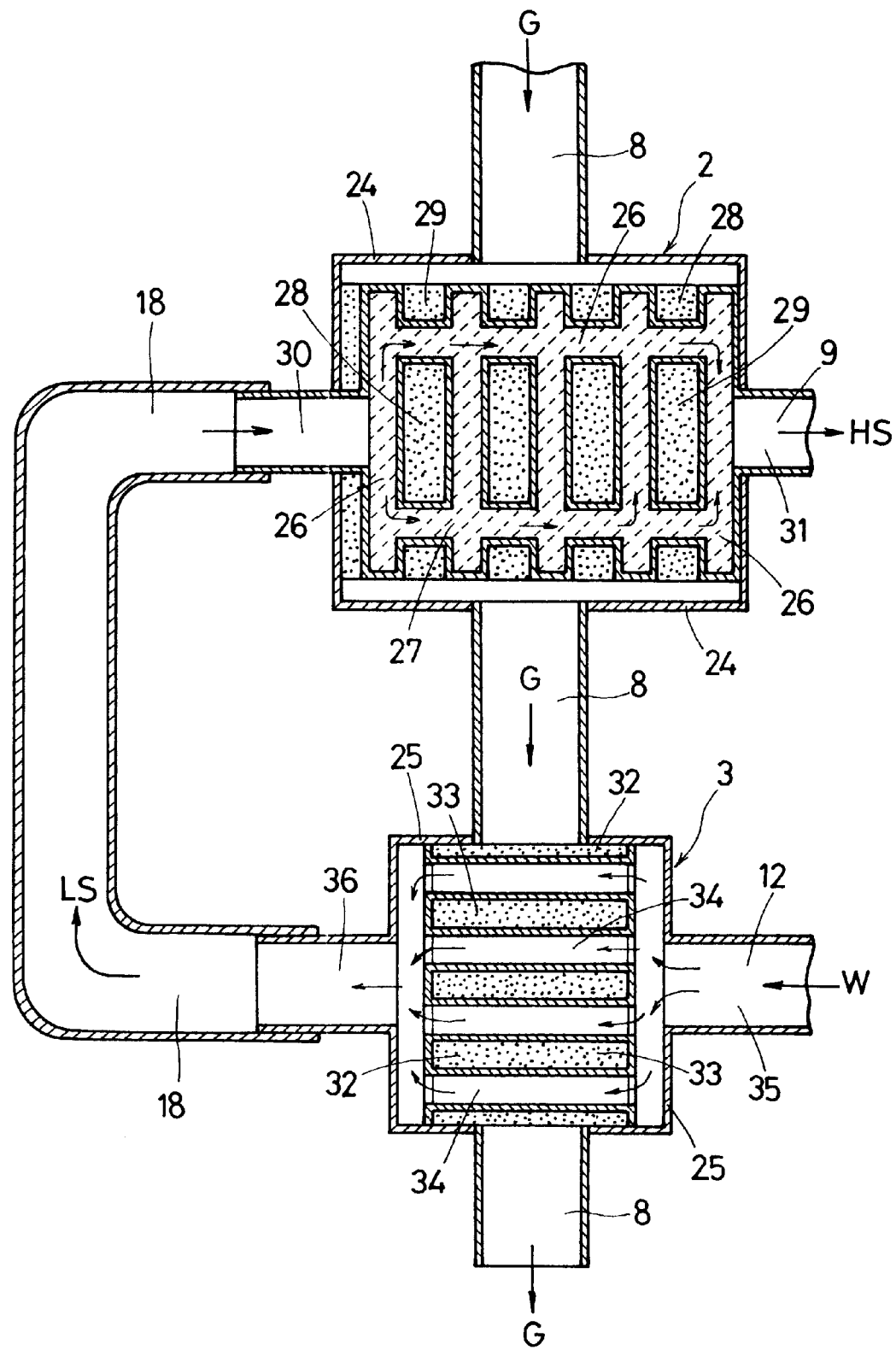
FIG. 1 is a sectional view showing an embodiment of the heat exchanger apparatus using a porous material according to the present invention.
Figure 2:
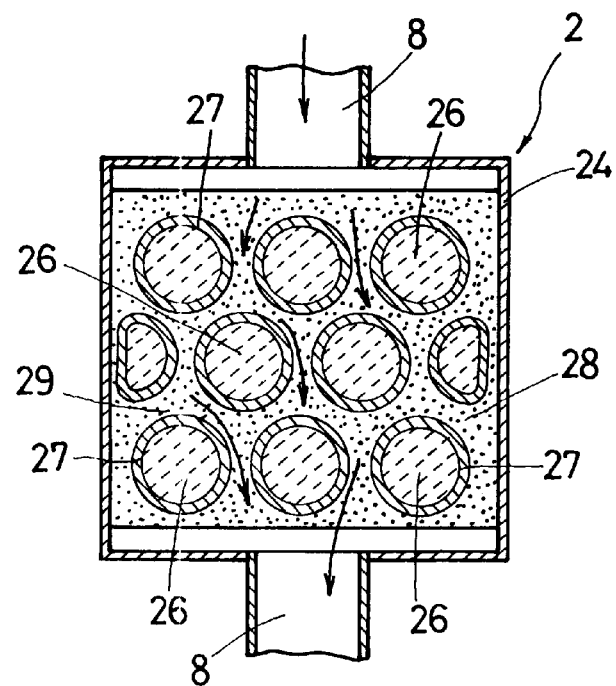
FIG. 2 is a sectional view for describing a cross section of a high-temperature heat exchanger shown in FIG. 1.
Figure 3:
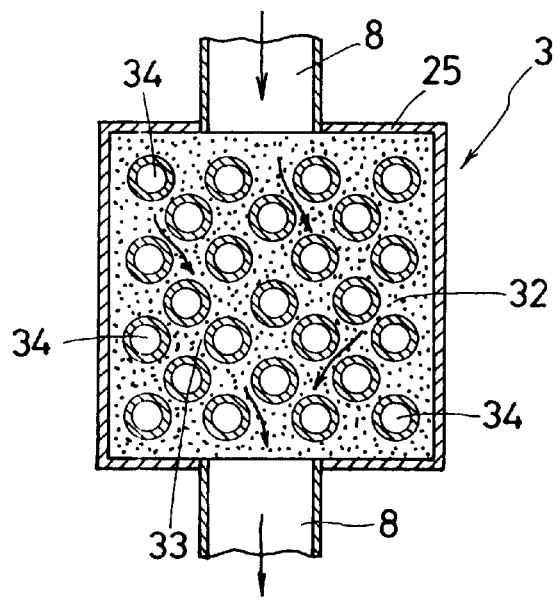
FIG. 3 is a sectional view for describing a cross section of a low-temperature heat exchanger shown in FIG. 1.

First, the heat exchanger apparatus comprising first and second heat exchangers using a porous material according to the present invention will now be described with reference to FIGS. 1, 2 and 3.

In order to heat low-temperature steam LS and turn the same into high-temperature steam by the thermal energy of an exhaust gas G flowing in an exhaust pipe 8, the heat exchanger apparatus according to the present invention is provided with a gas phase to gas phase heat exchanger, i.e. a high-temperature heat exchanger 2 (first heat exchanger) in the exhaust pipe 8, and a gas phase to liquid phase heat exchanger, i.e. low-temperature heat exchanger 3 (second heat exchanger) in the portion of the exhaust pipe 8 which is on the downstream side of the high-temperature heat exchanger 2, which heat exchanger 3 is adapted to heat the water W and turn the same into low-temperature steam LS by the thermal energy of the exhaust gas G.

The high-temperature heat exchanger 2 comprises a steam passage 26 provided in a housing 24, and exhaust gas passages 28 isolated from and provided in parallel with the steam passage 26, and the heat of an exhaust gas flowing in the exhaust gas passages 28 is transmitted to the steam flowing in the steam passage 26. The low-temperature steam LS is sent from the low-temperature heat exchanger 3 to the steam passage 26 through a steam passage 18 (second steam passage). The exhaust gas G from the exhaust pipe 8 is sent to the exhaust gas passages 28, and passes clearances among the steam passage 26.

In the high-temperature heat exchanger 2, the low-temperature steam LS sent thereinto from an inlet 30 is heated with the exhaust gas G and converted into a high-temperature steam HS, which then passes the steam passage 26 and is discharged to a steam passage 9 through an outlet 31. The exhaust gas passages 28 and steam passage 26 are filled with porous members 27, 29 comprising a ceramic material, such as $Si_3N_4$ and having open pores permitting a gas to pass therethrough, whereby the gas contacting area is set large. Since the high-temperature heat exchanger 2 is adapted to heat the low-temperature steam LS and turn the same into high-temperature steam HS, and carry out heat exchange between the exhaust gas G and the gases of the steam LS, HS, it is formed to a structure having a large heat exchange area and capable of improving a heat exchange efficiency.

The low-temperature heat exchanger 3 comprises a water passage 34 provided in a housing 25, and exhaust gas passages 32 isolated from and provided in parallel with the water passage 34, the heat of the exhaust gas flowing in the exhaust gas passages 32 being transmitted to the water W flowing in the water passage 34, whereby the water W is gasified into low-temperature steam LS. The water passage 34 receives water W from a water passage 12. The exhaust gas passages 32 receives the exhaust gas G from the exhaust pipe 8, and the exhaust gas G flows through clearances among the water passages 34.

The low-temperature heat exchanger 3 is adapted to heat the water W, which is sent thereinto from an inlet 35, with the exhaust gas G and gasify the same into low-temperature steam LS, which is discharged from an outlet 36 to the steam passage 18. The exhaust passages 32 are filled with porous members 33 comprising a ceramic material, such as $Si_3N_4$ and having open pores through which a gas passes. The low-temperature heat exchanger 3 is adapted to carry out heat exchange between the exhaust gas G and the liquid of the water W. Accordingly, the low-temperature heat exchanger 3 is formed to a structure having a large heat exchange area which the exhaust gas G passes, and a small heat exchange area, which the liquid, i.e. water W passes, as compared with the gas-side heat exchange area, and capable of improving the heat exchange efficiency.

Let $A_{g1}$ equal a contact area which the exhaust gas G passes, $A_1$ a wall surface area at which the steam passage 26 is exposed to the exhaust gas passages 28, and $A_{g2}$ a contact area which the steam S in the steam passage 26 passes, and the high-temperature heat exchanger 2 has the relation satisfying the following expression.

$$A_{g1}:A_1:A_{g2}=(1/\alpha_{g1}):(\delta/\lambda):(1/\alpha_{g2})$$

wherein $\delta$ represents a wall thickness, $\lambda$ solid heat conductivity, $\alpha_{g1}$ a heat transfer coefficient of the exhaust gas, and $\alpha_{g2}$ a heat transfer coefficient of the steam.

Let $\alpha_{g1}$ equal a contact area which the exhaust gas G passes, $A_2$ a wall surface area at which the water passage 34 is exposed to the exhaust gas passages 32, and $A_c$ a contact area which the water W passes, and the low-temperature heat exchanger 3 has the relation satisfying the following expression.

$$A_{g1}:A_2:A_c=(1/\alpha_{g1}):(\delta/\lambda):(1/\alpha_c)$$

wherein $\delta$ represents a wall thickness, $\lambda$ solid heat conductivity, $\alpha_{g1}$ a heat transfer coefficient of the exhaust gas, and $\alpha_c$ a heat transfer coefficient of the water.

In order to increase the contact area of the porous members 27, 29, 33 with respect to the gas passing therethrough in the heat exchanger apparatus, the density of the porous members 27, 29, 33 can be regulated properly by making them more dense or less dense. The exhaust gas passages 28, 32 and steam passage 26 can be formed by providing partition walls thereof by marking denser the outer side surfaces of the porous members 27, 29, 33 packed in these passages 28, 32, 26. In the high-temperature heat exchanger 2 in the illustrated embodiment, the porous member 27 is formed tubularly, and the outer surface portion thereof is made denser to obtain a partition wall, whereby the steam passage 26 is formed. In the low-temperature heat exchanger 3, the water passage 34 is formed tubularly out of dense $Si_3N_4$, the inner and outer surfaces of which are coated with SiC.

When the porous member 27 packed in the steam passage 26 comprises $Si_3N_4$, the surface thereof is coated with SiC. When the water passage 34 is formed out of $Si_3N_4$, the inner surface thereof is coated with SiC. Since $Si_3N_4$ is water soluble, it is preferable that the exposed $Si_3N_4$ surface be coated with SiC so as to reduce the corrosion of a surface portion in which cavitation, which cannot be dealt with easily, occurs. The application of SiC to the surface of the porous member 27 can be attained easily by melting polycarbosilane, which is obtained by mixing and heating, for example, polydimethyl silane and polyborodiphenyl siloxane, and depositing the polycarbosilane on the surface of the porous member 27 of $Si_3N_4$ through the porous member itself.

Figure 4:
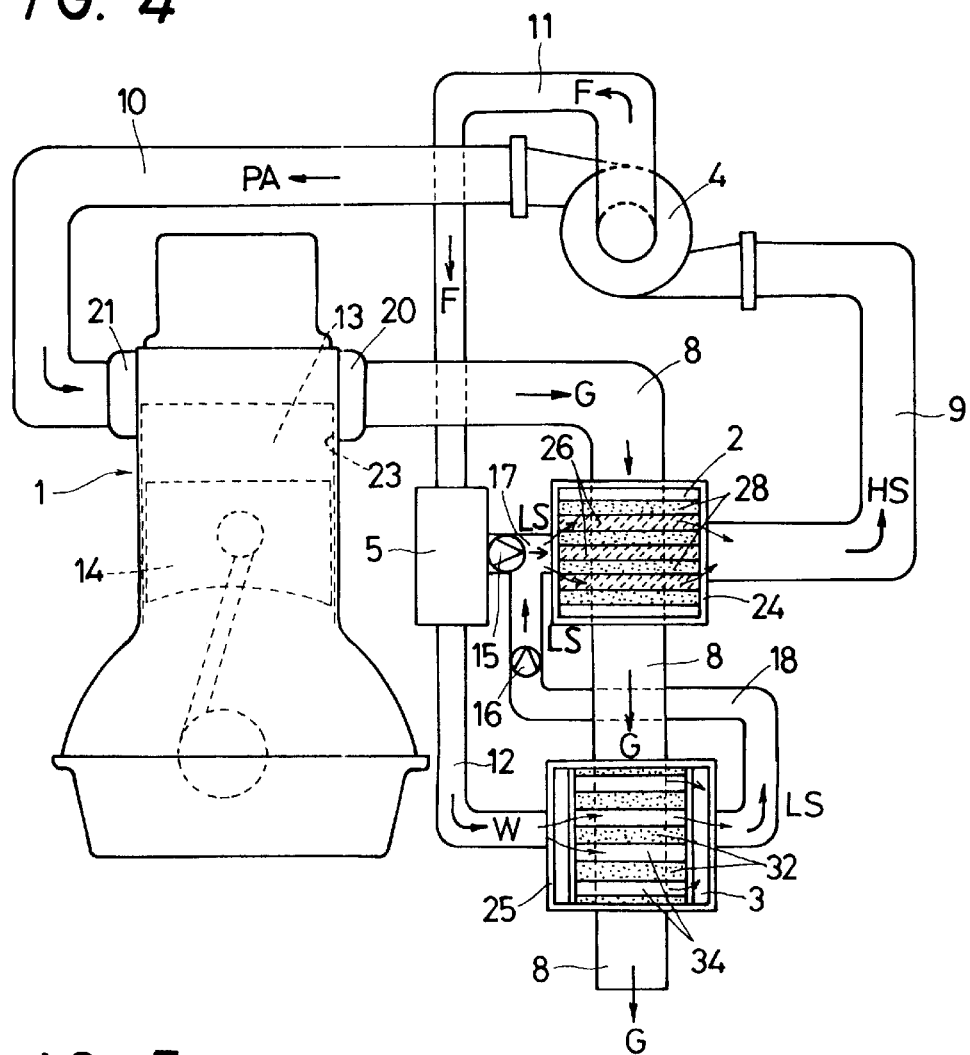
FIG. 4 is an explanatory view showing an embodiment of a ceramic engine provided with a supercharger driven by the thermal energy recovered by the heat exchanger apparatus according to the present invention.
Figure 5:
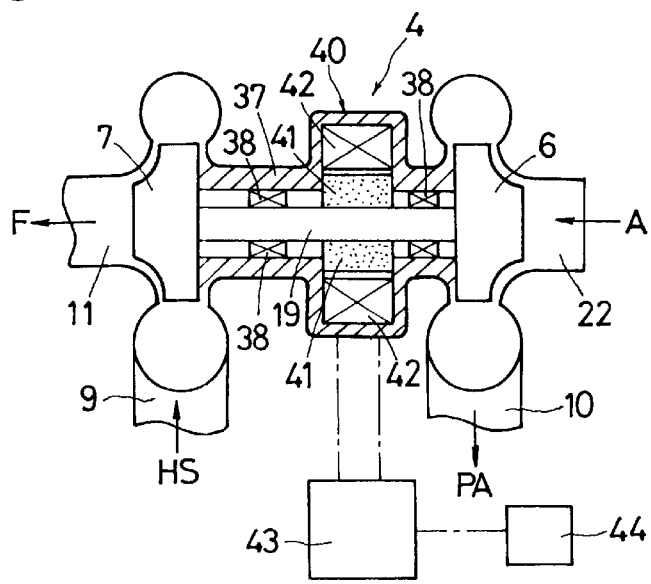
FIG. 5 is an explanatory view showing a steam turbine type supercharger provided with a steam turbine and a compressor and incorporated in the ceramic engine of FIG. 4.

An embodiment of the ceramic engine in which this heat exchanger apparatus is incorporated will now be described with reference to FIGS. 4, 5 and 6.

A ceramic engine 1 is a multicylinder or single cylinder engine operated by repeating in order four strokes including an intake stroke, a compression stroke, an expansion stroke and an exhaust stroke, and preferably used as an engine of a small load variation in a stationary cogeneration system.

In the ceramic engine 1, the details of which are not shown, a cavity is formed in, for example, a cylinder head fixed on a cylinder block, and a combustion chamber structure comprising a ceramic member is provided in this cavity, a liner being provided in a hole formed in the cylinder block. A combustion chamber 13 is formed by a cylinder liner and the combustion chamber structure, and the part of the combustion chamber 13 which is formed by the combustion chamber structure comprises a heat insulating structure. The combustion chamber structure and cylinder head are provided with intake ports and exhaust ports, in which an intake valve and an exhaust valve are provided respectively. A cylinder 23 forming the combustion chamber 13 is provided therein with a piston 14 so that the piston 14 is moved reciprocatingly therein.

In the ceramic engine 1, exhaust ports are collected at an exhaust manifold 20 and communicate with an exhaust pipe 8, and an exhaust gas G from the combustion chamber 13 is discharged to the exhaust pipe 8. Intake air sending pressurized air passage 10 communicates with an intake manifold 21, at which this passage 10 branches and are connected to each intake port, the branch passages communicating at the intake ports with the cylinders, i.e. combustion chambers 13. The exhaust gas G having thermal energy and occurring in the combustion chamber 13 is discharged from the combustion chamber 13 to the exhaust pipe 8 through the exhaust port and exhaust manifold 20.

The ceramic engine 1 comprises a high-temperature heat exchanger 2 (first heat exchanger) which is provided in the exhaust pipe 8 for heating low-temperature steam LS by the thermal energy of an exhaust gas discharged through the exhaust pipe 8, and turning the same into high-temperature steam HS, and which carries out gas phase to gas phase heat exchange, a low-temperature heat exchanger 3 (second heat exchanger) provided in the portion of the exhaust pipe 8 which is on the downstream side of the high-temperature heat exchanger 2, and adapted to carry out liquid phase to gas phase heat exchange in which the water W is heated by the thermal energy of the exhaust gas G and turned into low-temperature steam LS, and a steam turbine type supercharger 4 provided with a steam turbine 7 driven by the high-temperature steam HS from the high-temperature heat exchanger 2, and a compressor 6 driven by the steam turbine 7, and adapted to supply the pressurized air PA from the compressor 6 to the combustion chamber 13.

The ceramic engine 1 has a condenser 5 adapted to separate a fluid F discharged from the steam turbine 7 in the steam turbine type supercharger 4 into water W and low-temperature steam LS. The low-temperature steam LS, the pressure of which has been reduced in the condenser 5 is sent to the high-temperature heat exchanger 2 through the steam passage 17, in which a check valve 15 is provided so as to prevent the steam from flowing in the reverse direction. A steam passage 18 for sending the low-temperature steam LS from the low-temperature heat exchanger 3 to the high-temperature heat exchanger 2 is provided with a check valve 16 so as to prevent the steam from flowing in the reverse direction. The condenser 5 is adapted to separate the water W and steam LS from each other, and the steam LS the pressure of which has been reduced is sent to the high-temperature heat exchanger 2 without being reversed, the water W separated being sent to the low-temperature heat exchanger 3.

The steam turbine type supercharger 4 comprises a shaft 19 supported rotably on a housing 37 via bearings 38, and a steam turbine 7 mounted on one end portion of the driving shaft 19 and a compressor 6 mounted on the other end portion thereof. The steam turbine 7 is driven by the high temperature steam HS from the high-temperature heat exchanger 2. The pressurized air PA generated by the compressor 6 is supplied to the combustion chamber 13 through the pressurized air passage 10. The shaft 19 operatively connecting the compressor 6 to the steam turbine 7 is mounted with a generator-motor 40 comprising a rotor 41 formed of a permanent magnet fixedly mounted on the shaft 19, and a stator coil 42 disposed on the outer side of the rotor 41. A controller 43 is adapted to drive the generator-motor 40 and generate power, or put the generator-motor 40 in a non-driven condition, in accordance with the operational condition of the engine 1. The controller 43 is also adapted to control the electric power generated by the generator-motor 40 so that the electric power is accumulated in a battery 44. Accordingly, excessive energy is accumulated in the battery 44 in a certain operational condition of the engine 1, and this electric power accumulated in the battery 44 can be consumed as necessary by the generator-motor 40 and auxiliary machines.

In the high-temperature heat exchanger 2, the low-temperature steam LS from the low-temperature heat exchanger 3 is heated by the thermal energy of the high-temperature exhaust gas G and turned into high-temperature steam HS, while, in the low-temperature heat exchanger 3, the water W separated by the condenser 5 is heated by the residual energy of the exhaust gas G and turned into low-temperature steam LS. The high-temperature heat exchanger 2 is provided on the upstream side of a region in which the temperature of the exhaust gas G is high, and the low-temperature heat exchanger 3 on the downstream portion of the exhaust pipe 8 in which the exhaust gas G the thermal energy of which has been absorbed in the high-temperature heat exchanger 2 flows.

The high-temperature heat exchanger 2 comprises steam passages 26 provided in the housing 24 and filled with porous members, and exhaust gas passages 28 isolated from and extending in parallel with the steam passages 26 and filled with the porous members, and the heat of the exhaust gas flowing in the exhaust gas passages 28 is transmitted to the steam flowing in the steam passages 26.

The low-temperature heat exchanger 3 comprises water passages 34 provided in the housing 25, and exhaust gas passages 32 isolated from and extending in parallel with the water passages 34 and filled with porous members, and the heat of the exhaust gas flowing in the exhaust gas passage 32 is transmitted to the water W flowing the water passages 34, whereby the water W is gasified and turned into low-temperature steam LS.

The high-temperature heat exchanger 2 is adapted to heat low-temperature steam and turn the same into high-temperature steam, and carry out heat exchange between gases, i.e. the exhaust gas and steam. Therefore, this heat exchanger 2 is formed by a structure capable of increasing the heat exchange and heat exchange efficiency. The low-temperature heat exchanger 3 is adapted to carry out heat exchange between a gas and a liquid, i.e. the exhaust gas G and water. Therefore, this heat exchanger 3 is formed by a structure having a larger heat exchange area which the exhaust gas G passes, a smaller heat exchange area, which the liquid, i.e. water passes, as compared with the gas-side heat exchange area, and an improved heat exchange efficiency.

In this ceramic engine 1, the water W, low-temperature steam LS and high-temperature steam HS are circulated in a sealed state in the steam turbine 7 in the steam turbine type supercharger 4, condenser 5, low-temperature heat exchanger and high temperature heat exchanger 2 owing to the above-described construction, and the thermal energy of the exhaust gas G is recovered as compression work. The water W separated from the fluid F in the condenser 5 is sent to the low-temperature heat exchanger 3 through the water passage, and heated by the thermal energy of the exhaust gas G in the low-temperature heat exchanger 3, the water being thus gasified and turned into low-temperature steam LS. The low-temperature steam LS generated in the low-temperature heat exchanger 3 is then sent to the high-temperature heat exchanger 2 through the low-temperature steam passage 18 without being reversed owing to the function of the check valve 16. The low-temperature steam LS separated from the fluid F in the condenser 5 is sent to the high-temperature heat exchanger 2 through the low-temperature steam passage 17 (first steam passage) without being reversed owing to the function of the check valve 15.

The low-temperature steam LS sent to the high-temperature heat exchanger 2 is heated by the energy of the high-temperature exhaust gas G to a higher temperature in the high-temperature heat exchanger 2, i.e., turned into high-temperature steam HS. This high-temperature steam HS heated to a high temperature in the high-temperature heat exchanger 2 is then introduced into the steam turbine 7 in the steam turbine type supercharger 4 through the high-temperature steam passage 9, where it drives the steam turbine 7. This high-temperature steam HS drives the steam turbine 7 and thereby consumes the thermal energy thereof, and the greater part of the fluid F comprising water W and low-temperature steam LS is converted into water W, which is recovered by the condenser 5, comprising a separator, through a fluid discharge passage 11. The exhaust gas G discharged from the combustion chamber 13 of the engine 1 through the exhaust pipe 8 is subjected to the absorption of a large quantity of thermal energy in the high-temperature heat exchanger 2 to give calorific power to the steam, and the thermal energy is further absorbed in the low-temperature heat exchanger 3 to gasify the water W, the resultant low-temperature exhaust gas G being discharged to the atmospheric air.

In the ceramic engine 1, it is possible to display the characteristics of the high-temperature heat exchanger 2 and low-temperature heat exchanger 3 provided in the exhaust pipe 8, secure high-temperature steam, drive powerfully the steam turbine 7 in the steam turbine type supercharger 4, transmit the torque of the steam turbine 7 to the compressor 6 through the shaft 19, and turn the air A from the air inlet 22 of the compressor 6 into sufficiently pressurized air PA and discharge the same to the pressurized air passage 10.

The pressurized air PA supplied from the compressor 6 in the steam turbine type supercharger 4 presses down the piston 14 reciprocatingly moved in the combustion chamber during an intake stroke, whereby compression work can be carried out. The temperature of the steam HS which has driven the steam turbine 7 decreases, and this steam HS turns into a fluid F comprising water and steam, which is recovered by the condenser 5 via the fluid discharge passage 11.

In the ceramic engine 1, the thermal energy of the exhaust gas G is recovered by, for example, the high-temperature heat exchanger 2 and low-temperature heat exchanger 3. When an overall efficiency in the steam turbine 7 driven by this thermal energy is 50%, an average effective pressure becomes $4 \times 0.5 = 2 (kg/cm^2)$ in consideration of the enthalpy. In view of a basic thermal efficiency of the engine, it shows that the recovery efficiency is 12.5%. Accordingly, the gain of $2 \ kg/cm^2$ based on the energy recovery efficiency of the ceramic engine 1 can exceed that of $1.28 \ kg/cm^2$ of the total energy recovered by conventional turbocharges and energy recovery turbines.

Figure 6:
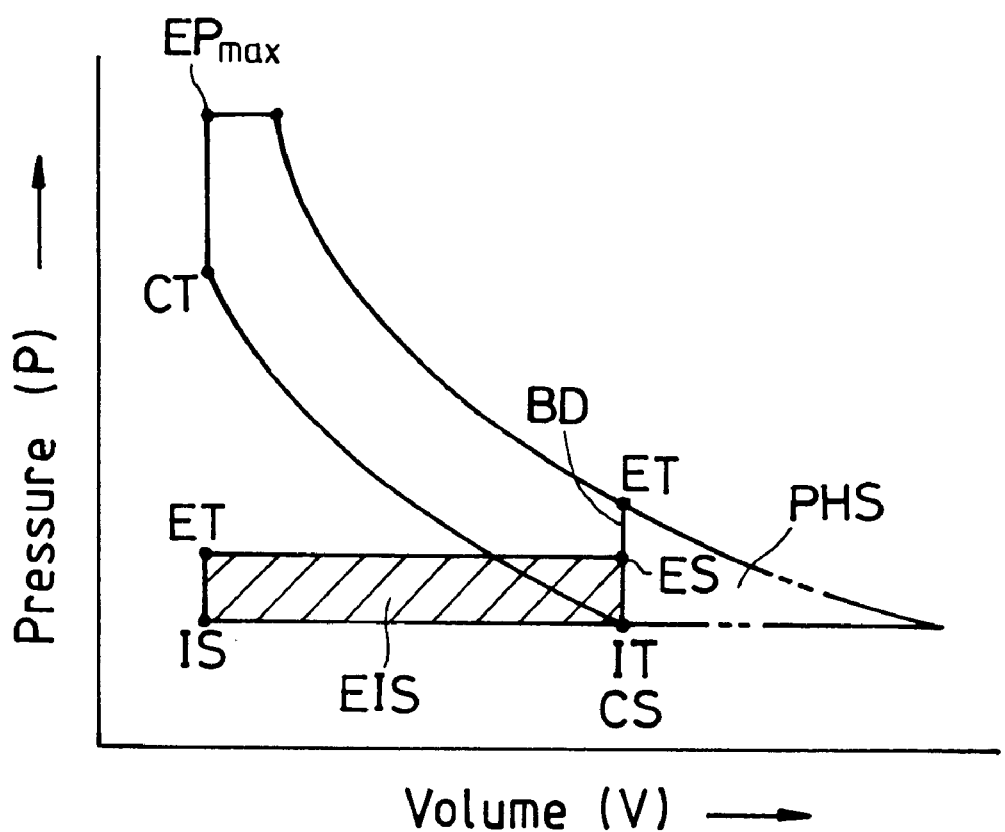
FIG. 6 is a PV diagram showing an operational condition of the ceramic engine of FIG. 4.

As shown in a hatched portion EIS of the PV diagram of FIG. 6, this portion constitutes negative turbine work during a period from the beginning ES of an exhaust stroke to a terminal end ET thereof and a period from the beginning IS of an intake stroke to a thermal end IT thereof in a conventional engine provided with a turbocharger and an energy recovery turbine but, in the ceramic engine 1 according to the present invention, the same hatched portion EIS constitutes work for driving the compressor 6 by the thermal energy recovered by the two heat exchangers 2, 3 so that the intake air pressure increases, the hatched portion EIS thereby carrying out compression work for pressing down the piston 14 during an intake stroke, whereby the thermal efficiency can be improved. The quantity of heat PHS of the exhaust gas discharged at the time of blowdown BD after the exhaust valve is opened at the terminal end of an expansion stroke is recovered in a Rankine cycle by the heat exchangers 2, 3 and steam turbine 7.

Referring to the PV diagram of FIG. 6, the intake valve opens the intake port, and the pressurized air PA is introduced into the combustion chamber 13 at the beginning IS of an intake stroke. The pressurized air PA presses down the piston 14 to carry out compression work, and the thermal energy of the exhaust gas is recovered, the intake stroke then reaching the terminal end IT. Accordingly, the hatched portion EIS in the PV diagram constitutes positive work as compression work. The intake valve then closes the intake port, and a compression stroke is started CS, the piston 14 moving up to cause the suction air in the cylinder, i.e. combustion chamber 13 to be compressed. When the compression stroke reaches a position in the vicinity of the terminal end CT thereof, the fuel in the combustion chamber 13 is ignited and burned, and the pressure in the cylinder 23 reaches a maximum level EPmax. The operation of the piston is transferred to an expansion stroke, and the combustion gas presses down the piston 14. In a position in the vicinity of the terminal end ET of the expansion stroke, the exhaust valve opens the exhaust port to start an exhaust stroke, and the exhaust gas is blown down BD into the exhaust pipe 8. Consequently, the piston 14 moves up to cause the exhaust gas G in the combustion chamber 13 to be discharged to the outside through the exhaust pipe 8, and the piston 14 then reaches the upper dead center to terminate ET the exhaust stroke, whereby the exhaust valve closes the exhaust port. The engine 1 is transferred to an intake stroke again, and the thermal energy of the exhaust gas discharged to the exhaust pipe 8 is recovered in a Rankine cycle.

Concretely speaking, this energy is converted into steam energy by the two heat exchangers 2, 3, and the steam turbine 7 is thereby driven to operate the compressor 6, the pressurized air from which works on the piston 14 in an intake stroke and is recovered as compression work (corresponding to the portion shown by reference letters EIS).

What is claimed is:

1. A ceramic engine comprising a combustion chamber having a heat insulating structure;
   a first heat exchanger provided in an exhaust pipe for discharging an exhaust gas from said combustion chamber to heat steam to a high temperature by the thermal energy of said exhaust gas discharged through said exhaust pipe;
   a second heat exchanger provided in said exhaust pipe downstream from said first heat exchanger to heat up water to convert water to steam, which steam is fed to said first heat exchanger; and
   a steam turbine supercharger driven by said steam generated by the thermal energy of said exhaust gas which is provided with a steam turbine driven by the high temperature steam from said first heat exchanger, and a compressor driven via a driving shaft of said steam turbine, and which is adapted to supply pressurized air from said compressor to said combustion chamber;
   wherein said first heat exchanger comprises a first exhaust gas passage and a steam passage isolated from said first exhaust gas passage by partition walls to allow said steam fed from said second heat exchange to flow through said steam passage; and
   wherein said second heat exchanges comprises a second exhaust gas passage and a water passage isolated from said second exhaust gas passage by partition walls to allow said water to flow through said water passage.

2. The ceramic engine according to claim 1, wherein said pressurized air supplied from said compressor in said steam turbine type supercharger to said combustion chamber presses down a piston, which is moved reciprocatingly in said combustion chamber during an intake stroke, and acts on an engine crankshaft.

3. The ceramic engine according to claim 1, wherein said engine has a condenser adapted to separate a fluid discharged from said steam turbine in said steam turbine type supercharger into water and steam and thus reduce a steam pressure, the steam in said first heat exchanger, from said second heat exchanger being heated and turned into high-temperature steam in said first heat exchanger, said water from said condenser being gasified into steam in said second heat exchanger.

4. The ceramic engine according to claim 1, wherein a first steam passage for sending low-temperature steam from said condenser to said first heat exchanger is provided with a first check valve therein.

5. The ceramic engine according to claim 1, wherein a second steam passage for sending steam from said second heat exchanger to said first heat exchanger is provided with a second check valve therein.

6. The ceramic engine according to claim 1, wherein said combustion chamber, said exhaust pipe extending from said combustion chamber to said first heat exchanger, and said exhaust pipe extending from said first heat exchanger to said second heat exchanger are formed to heat insulating structures by ceramic members.

7. The ceramic engine according to claim 1, wherein said driving shaft for operatively connecting said compressor to said steam turbine is mounted with a generator-motor comprising a rotor formed of a permanent magnet fixedly mounted on said driving shaft, and a stator coil provided on the outer side of said rotor.

8. The ceramic engine according to claim 1, wherein said engine is incorporated in a stationary cogeneration system.

9. The ceramic engine according to claim 1 wherein first porous members are packed in said first exhaust gas passage and said steam passage, wherein said first porous members have open pores.

10. The ceramic engine according to claim 9 wherein said first porous members comprise $Si_3N_4$, and the surfaces of said first porous members are coated with SiC.

11. The ceramic engine according to claim 1 wherein second porous member are packed in said second exhaust gas passage, wherein said second porous members have open pores.

12. The ceramic engine according to claim 11, wherein said second porous members comprises $Si_3N_4$, and the surfaces of said second porous members are coated with SIC.

* * * * *